UNITED STATES PATENT OFFICE.

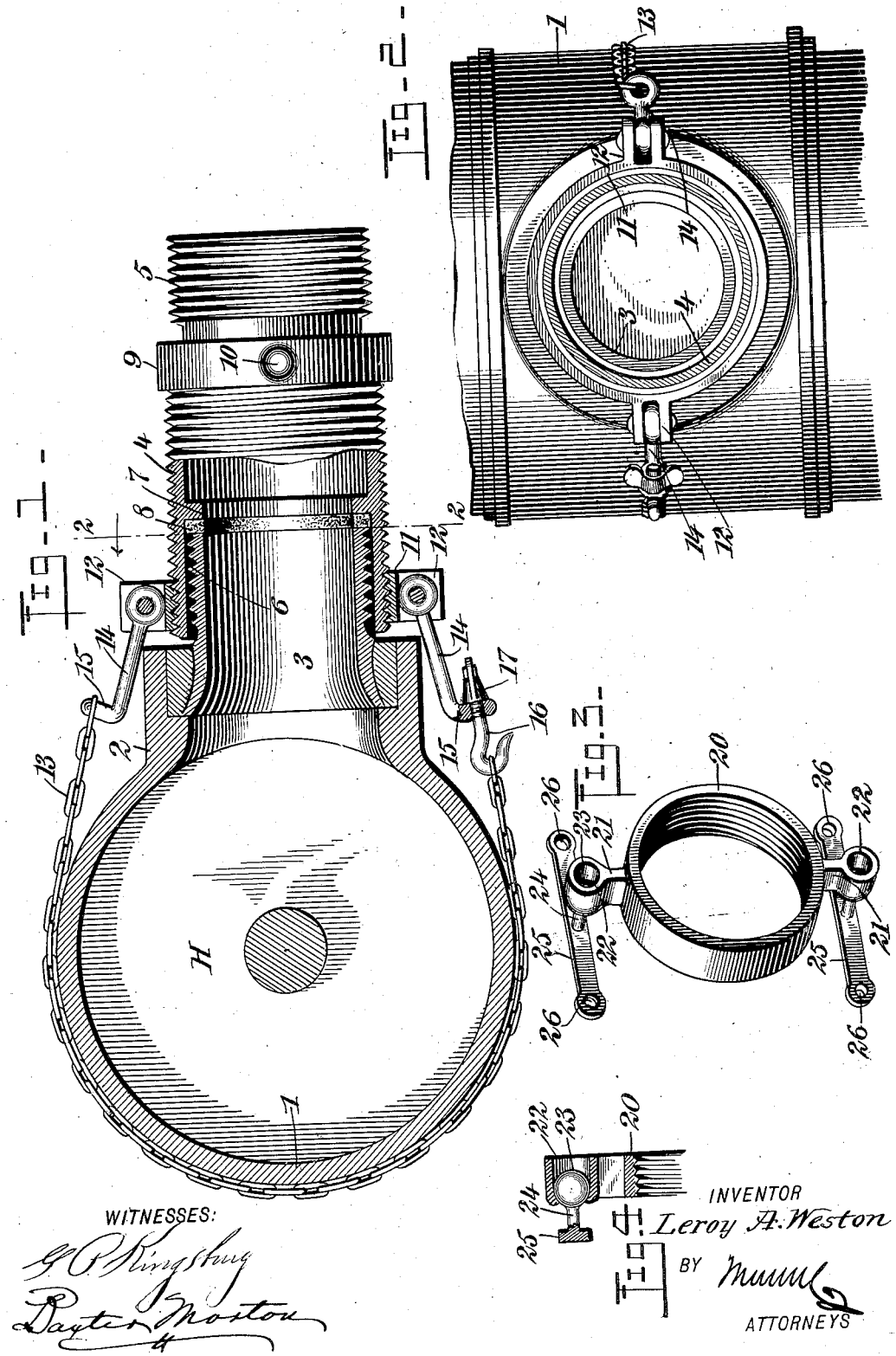

LEROY AUGUSTUS WESTON, OF ADAMS, MASSACHUSETTS.

HOSE AND HYDRANT CONNECTION.

No. 812,625.

Specification of Letters Patent.

Patented Feb. 13, 1906.

Application filed April 20, 1904. Renewed August 8, 1905. Serial No. 273,322.

*To all whom it may concern:*

Be it known that I, LEROY AUGUSTUS WESTON, a citizen of the United States, and a resident of Adams, in the county of Berkshire and State of Massachusetts, have invented a new and Improved Hose and Hydrant Connection, of which the following is a full, clear, and exact description.

This invention relates to devices whereby hose having coupling members provided with standard threads or threads adapted to those provided upon the device may be operatively connected with hydrants presenting thimbles whose threads do not conform to those of the coupling member provided on the hose-section.

The object of the invention is to provide a simple, inexpensive, and thoroughly-effective device whereby a hose having a coupling provided with a thread adapted to the connecting device may be quickly and securely attached to a hydrant having a thimble upon which the threads do not correspond to those of the hose.

The object above stated is attained in the novel hose and hydrant connection hereinafter described in two slightly different forms of embodiment and having the novel features thereof particularly pointed out in the appended claims, it being understood that changes in the minor details of construction may be made without departing from the spirit of the invention or sacrificing the advantages thereof.

Reference is to be had to the accompanying drawings, forming a part of this specification, in which similar characters of reference indicate corresponding parts in all the views.

Figure 1 is a view chiefly in horizontal section through an ordinary fire-hydrant, showing the hose and hydrant connection forming the present invention in operative relation to the hydrant. Fig. 2 is a sectional view on the line 2 2 of Fig. 1 of a portion of the hydrant and of the hose and hydrant connection in position thereon, and Figs. 3 and 4 are detail views showing a slightly different form of collar for the attachment of the hydrant-encircling means and providing for the use of a plurality of chains or bands for encircling the hydrant.

Referring to the drawings, H designates generally an ordinary fire-hydrant comprising a cylindrical shell 1, having a laterally-projecting branch pipe 2, in which an externally-threaded thimble 3 is secured in any preferred manner.

4 designates an externally-threaded tubular coupling member presenting at one end a slightly-reduced portion 5, provided with a standard thread for engagement with a female coupling member provided with a corresponding thread and attached to a section of hose. The tubular member 4 is provided at its larger end with a smooth-bored chamber 6, into which the externally-threaded thimble 3 of the hydrant will pass freely, and a flange 7 is formed within the tubular member 4 to form an abutment against which a gasket 8 is lodged. The gasket 8 is provided for contact with the end of the thimble 3 to form a water-tight joint therewith in the usual manner. Intermediate between the reduced portion 5 and the larger portion of the tubular member 4 an unthreaded portion 9 is formed upon the surface of which there are preferably provided one or more projecting studs 10, with which a hose-spanner of the ordinary type will engage.

To secure the tubular connecting member 4 in operative relation to the thimble 3 of the hydrant, an internally-threaded collar 11 is mounted upon the externally-threaded larger end of the member 4, and a flexible member is connected with lugs 12, projecting laterally from the collar. The flexible member consists, preferably, of a chain 13 and a pair of pivoted arms 14, each provided at its free end with an eye 15, as shown. To one of the arms 14 the chain 13 is permanently secured by fastening one end of the chain in the eye 15 of the said arm. In the eye 15 of the other arm a hook 16 is swiveled, and the shank of the hook is threaded to carry a thumb-nut 17. The hook 16 is adapted to engage with the links of the chain, and by means of the thumb-nut 17 any slack in the chain may be drawn up.

In applying the connection to a hydrant the tubular member 4 is fitted over the thimble 3 of the hydrant and the chain 13 is passed around the hydrant and drawn as taut as it can be drawn by hand. The hook 16 is then connected with the nearest link, and the nut 17 is turned to take up the slack in the chain. When the chain has been drawn as taut as possible by means of the nut 17, a spanner will be applied to one of the studs 10, provided upon the smooth-surfaced portion 9 of the connecting member 4, and rotation will be imparted to the member 4 to force it inward through the threaded collar 11, which is held against rotation by means of the chain and the arms 14, to which the chain is connected. The inward movement of the member 4 in the collar 11 forces the gasket 8 against the end of the thimble 3 until a sufficient degree of pressure is produced to insure a water-tight joint. After the connection is in position upon a hydrant, as shown in Fig. 1, the application of the hose thereto is accomplished in the ordinary way, or if it is necessary to employ a hose having a thread which does not correspond to the thread on the reduced portion 5 of the member 4 a coupling device of the kind provided for this purpose and described in my companion application, Serial No. 204,040, may be employed.

In case it is desired to employ more than one chain to hold the member 4 upon the thimble of the hydrant in order to prevent the possibility of any lateral strain upon the thimble the member 4 may be provided with a collar 20 of the form shown in Fig. 3. This collar has a pair of oppositely-arranged laterally-projecting lugs 21, each of which is provided with a socket 22 to receive a ball 23 at the end of a stem 24, which projects from a bar 25, provided at its ends with eyes 26 to receive the ends of a pair of chains similar to the chains 13 or suitable devices for connection with said chains. When two chains are employed, it is preferable to extend the chains around the hydrant in somewhat oblique directions, the two chains crossing at the back of the hydrant. By the provision of two chains a somewhat more secure fastening is effected, and by connecting the bars 25 with the collar 20 by means of ball-and-socket joints all tendency to lateral strain upon the thimble 3 from inequalities in tension upon the chains is obviated, the bars 25 being capable of adapting themselves automatically to the strains placed thereon, so that equality in the strains upon the two chains must necessarily result.

Having thus described my invention, I claim as new and desire to secure by Letters Patent—

1. A hose and hydrant connection, comprising a tubular member adapted at one end for engagement with the coupling member of a hose-section, and having at the other end a smooth-bored socket to receive the threaded thimble of a hydrant, and means carried by said tubular member for securing it in position upon a hydrant.

2. A hose and hydrant connection, comprising a tubular member threaded at one end for engagement with a coupling member carried by a hose-section and having a smooth-bored socket at the other end to receive the thimble of a hydrant, and means carried by said tubular member for securing it in position upon a hydrant.

3. A hose and hydrant connection, comprising an externally-threaded tubular member adapted at one end for engagement with a coupling member carried by a hose-section, and having at the other end a socket adapted to receive the thimble of a hydrant, a collar threaded upon the outer surface of said tubular member, and means carried by said collar for securing the tubular member in position upon a hydrant.

4. A hose and hydrant connection, comprising a tubular member having a socket adapted to receive the thimble of a hydrant, and flexible means carried by said tubular member to encircle the hydrant, and means also carried by said tubular member for placing said flexible means under tension.

5. A hose and hydrant connection, comprising a tubular member having a smooth-bored socket adapted to receive the thimble of a hydrant, a collar adjustable on said tubular member, flexible means carried by said collar to encircle a hydrant, and means carried by said collar for tightening said flexible means.

6. A hose and hydrant connection, comprising a tubular member adapted to receive the thimble of a hydrant, a collar adjustably mounted on said tubular member, pivoted arms carried by said collar, a flexible member connecting said arms, and means for drawing said flexible member taut.

7. A hose and hydrant connection, comprising an externally-threaded tubular member having a smooth-bored socket in one end thereof to receive a hydrant-thimble, a collar threaded upon said tubular member, flexible means carried by said collar to encircle the hydrant, and means provided on said tubular member for rotating the said tubular member within said collar.

8. The combination in a hose and hydrant connection, of a tubular member having a smooth-bored socket in one end thereof and having the other end threaded for engagement with a coupling member carried by a hose-section, a collar threaded upon the end of the tubular member having the socket therein, a pair of pivoted arms carried by said collar, a flexible member attached to one of said arms, a hook carried by the other of said arms and adapted to engage the flexible member, and means for adjusting said hook in the pivoted member to apply tension to said flexible member.

9. A hose and hydrant connection comprising a tubular member having a socket adapted to receive the thimble of a hydrant, a collar adjustable on said tubular member, pivoted arms carried by said collar, and a flexible member connecting said arms.

10. A hose and hydrant connection comprising a tubular member having a socket adapted to receive the thimble of a hydrant, a collar adjustably mounted on said tubular member, pivoted arms carried by said collar, a flexible member attached to one of said arms, and a hook adjustable in the other arm and adapted to engage the flexible member.

11. A hose and hydrant connection comprising a tubular member having a socket adapted to receive the thimble of a hydrant, a collar threaded upon said tubular member flexible means carried by said collar to encircle the hydrant, means carried by said collar for tightening said flexible means, and means on said tubular member for engagement by a spanner to rotate the tubular member within said collar.

12. A hose and hydrant connection comprising an externally-threaded tubular member provided at one end with a reduced threaded portion for engagement with a coupling member, and having at the other end a socket adapted to receive the thimble of a hydrant, flexible means carried by said tubular member to encircle the hydrant, and means also carried by said tubular member for placing said flexible means under tension.

In testimony whereof I have signed my name to this specification in the presence of two subscribing witnesses.

LEROY AUGUSTUS WESTON.

Witnesses:
BURDETTE H. MILLIMAN,
JOHN H. ALLEN